United States Patent
Binder et al.

(10) Patent No.: US 12,000,436 B2
(45) Date of Patent: Jun. 4, 2024

(54) COUPLING DEVICE AND METHOD OF OPERATING A COUPLING DEVICE

(71) Applicant: Hoerbiger Antriebstechnik Holding GmbH, Schongau (DE)

(72) Inventors: Jürgen Binder, Schongau (DE); Peter Echtler, Schongau (DE); Markus Sauter, Schongau (DE)

(73) Assignee: Hoerbiger Antriebstechnik Holding GmbH, Schongau (DE)

( * ) Notice: Subject to any disclaimer, the term of this patent is extended or adjusted under 35 U.S.C. 154(b) by 0 days.

(21) Appl. No.: 17/933,979

(22) Filed: Sep. 21, 2022

(65) Prior Publication Data

US 2023/0086003 A1 Mar. 23, 2023

(30) Foreign Application Priority Data

Sep. 22, 2021 (DE) .......... 102021124595.8

(51) Int. Cl.
*F16D 11/14* (2006.01)
*F16D 11/00* (2006.01)

(52) U.S. Cl.
CPC ........ *F16D 11/14* (2013.01); *F16D 2011/006* (2013.01); *F16D 2011/008* (2013.01)

(58) Field of Classification Search
CPC .......... F16D 11/04; F16D 11/10; F16D 11/14; F16D 2011/002; F16D 2011/006; F16D 2011/008
See application file for complete search history.

(56) References Cited

U.S. PATENT DOCUMENTS

| | | | | |
|---|---|---|---|---|
| 4,303,151 A | * | 12/1981 | Kolacz .................... | F16D 11/12 192/48.91 |
| 5,038,884 A | * | 8/1991 | Hamada ................ | F16D 27/118 192/114 R |
| 5,273,499 A | * | 12/1993 | Friedl ..................... | F16H 48/08 475/236 |
| 2017/0044832 A1 | * | 2/2017 | Hanna ..................... | F16D 25/08 |
| 2021/0190150 A1 | * | 6/2021 | Trinkenschuh ......... | F16D 27/09 |

FOREIGN PATENT DOCUMENTS

DE 102015223375 A1 * 6/2017

* cited by examiner

*Primary Examiner* — Huan Le
(74) *Attorney, Agent, or Firm* — McNees Wallace & Nurick LLC

(57) ABSTRACT

A coupling device for coupling two components in a torque-conducting manner including a first coupling component having a first external toothing and a second coupling component having a second external toothing. In addition, the coupling device has a sliding sleeve having an internal toothing which is permanently engaged with the first external toothing and can be selectively brought into engagement with the second external toothing. Furthermore, a locking unit is provided which can selectively assume a locking state in which the sliding sleeve is held in a form-fitting manner in a rotationally coupled state. In addition, the locking unit can selectively assume an unlocking state.

13 Claims, 9 Drawing Sheets

COUPLING DEVICE AND METHOD OF OPERATING A COUPLING DEVICE

TECHNICAL FIELD

The disclosure relates to a coupling device for coupling two components in a torque-conducting manner, having a first coupling component which is rotatable about an axis of rotation, has an at least sectionally circumferential first external toothing and is adapted to be fastened to one of the components to be coupled. Furthermore, a second coupling component is provided, which is rotatable about the axis of rotation, has an at least sectionally circumferential second external toothing and is adapted to be fastened to the other of the components to be coupled. In addition, the coupling device comprises a sliding sleeve which has an at least sectionally circumferential internal toothing which is permanently engaged with the first external toothing and can be selectively brought into engagement with the second external toothing so that the first coupling component and the second coupling component are coupled in a torque-conducting manner in a rotationally coupled state, in which the internal toothing is engaged with both the first external toothing and the second external toothing, and are rotationally decoupled in a release state, in which the internal toothing and the second external toothing are disengaged.

In addition, the disclosure is directed to a method of operating a coupling device for coupling two components in a torque-conducting manner, the coupling device comprising a first coupling component which is rotatable about an axis of rotation, has an at least sectionally circumferential first external toothing, and is adapted to be fastened to one of the components to be coupled. The coupling device further comprises a second coupling component which is rotatable about the axis of rotation, has an at least sectionally circumferential second external toothing, and is adapted to be fastened to the other of the components to be coupled. The coupling device additionally has a sliding sleeve which has an at least sectionally circumferential internal toothing which is permanently engaged with the first external toothing and can be selectively brought into engagement with the second external toothing.

BACKGROUND

Such coupling devices and methods of operating a coupling device are known from the prior art.

When operating a coupling device, it is of great importance that a desired shifting state, e.g. the rotationally coupled state or the release state, is always reliably achieved and maintained. The coupling device should therefore always be in a well-defined state. This also applies in particular in the event of a fault, i.e. in an operating situation in which the coupling device does not function properly. A possible fault situation relates to the failure of a power supply to an actuator provided for actuating the coupling device.

Against this background, it is known to configure moving components of coupling devices to be spring-loaded so that they always assume a predefined position in the absence of an actuating force. In this way, for example, a so-called normally-open coupling can be created which assumes its release state when no actuating forces are acting. It is understood that the spring means used for spring loading must be designed such that spring forces provided by this spring means can overcome any frictional forces which may occur inside the coupling device. In other words, it must be ensured that the spring-loaded components reliably reach their predefined position despite frictional effects occurring inside the coupling device. Depending on the size and design of the coupling device, relatively strong spring means are required for this purpose. Such a configuration also means that usually, an actuator for actuating the coupling device must also be configured to be relatively powerful. In a normal operating situation, it must be able to shift the coupling device against the spring force and hold it in the shifted state. The latter is necessary so that torque can be transmitted by means of the coupling device with consistently high reliability.

The same applies if a coupling device is designed as a so-called normally-closed coupling. In this context, it is known to urge the coupling in its rotationally coupled state using a spring means. The spring forces must thus now be overcome by means of an actuator to open the coupling device, i.e. to reach and hold the release state. A powerful actuator is therefore also required in this context.

In both cases, a coupling device is obtained which requires a relatively large installation space and for the actuation of which a comparatively high power is necessary.

These drawbacks are to be eliminated by means of the disclosure. Therefore, the object of the disclosure is to create a coupling device which always assumes a defined shifting state and is compact in design. Furthermore, the coupling device should be shiftable with comparatively low forces.

SUMMARY

The object is achieved by a coupling device of the type initially mentioned, which comprises a locking unit having a locking element, the locking element being mounted in a displaceable manner on the sliding sleeve. The locking unit can selectively assume a locking state in which the locking element engages in a locking contour on the first coupling component so that the sliding sleeve is held in a form-fitting manner in the rotationally coupled state. The locking unit can further selectively assume an unlocking state in which the locking element is located outside the locking contour. The coupling device can thus be held in the rotationally coupled state with particularly high reliability. This also applies in particular in cases where the magnitude of the torque to be transmitted by means of the coupling device fluctuates or the direction of the torque to be transmitted changes. Due to the fact that the locking unit acts in a form-fitting manner, only comparatively low forces and actuator power are required to hold the locking state and thus to hold the rotationally coupled state. The engagement of the rotationally coupled state and the locking state can also be performed using comparatively low actuating forces.

The first coupling component is, for example, a hub which is attached to or formed on a first shaft. Thus, the first coupling component may be integral with an associated first shaft or may be a separate component connected to the first shaft.

The second coupling component may be designed as a clutch disk formed on or attached to a second shaft, which may selectively be coupled to the first shaft in a torque-conducting manner. The second coupling component may thus be integral with an associated second shaft. It is also possible to manufacture the second coupling component as a separate element which is connected to the second shaft.

The coupling device may also have a latching unit for selectively latching the locking unit in the locking state. Therefore, the locking unit is held in the locking state with maximum reliability by means of the latching unit. As a result, the coupling device is also reliably held in the rotationally coupled state. The coupling device thus always assumes at least the rotationally coupled state with high reliability.

According to one embodiment, the latching unit comprises an at least sectionally sleeve-shaped latching component having a receiving contour and a latching contour, which peripherally surrounds the sliding sleeve at least in sections. In a latching state, the locking element is held in the locking state by abutment against the latching contour. In an unlatching state, the locking element is received at least in sections in the receiving contour so that the locking element can assume the unlocking state. The latching unit thus also operates in a form-fitting manner. As a result, a latching state can be engaged and held with comparatively low forces and/or power. In addition, a latching unit having an at least sectionally sleeve-shaped latching component has an extremely compact design.

The receiving contour may be a peripherally at least sectionally circumferential groove. The receiving contour can thus be easily produced using standard methods and equipment. At least one wall of the groove can be designed to be inclined. In this way, the transfer of the locking element from the unlocking state, in which it is received in the groove, to the locking state can be simplified. Furthermore, a receiving contour designed as a groove requires little space.

According to one variant, the locking unit and the latching unit are actuated by means of the same actuator which also serves to shift the coupling device. Thus, the latching component is displaced by means of the same actuator which is used to displace the sliding sleeve. The same applies at least indirectly to the locking element. A simple and compact structure of the coupling device is thus obtained.

The sliding sleeve may also comprise a magnetizable material so that the sliding sleeve is displaceable by means of an electromagnetic actuator. Such a configuration is structurally particularly simple and compact. The sliding sleeve can be made entirely or partially of a magnetizable material, e.g. a ferromagnetic steel. Alternatively, it is also possible for a magnetizable material to be attached to the sliding sleeve. In both cases, the sliding sleeve can be reliably and efficiently displaced by means of the electromagnetic actuator.

According to one variant, the latching component comprises a magnetizable material so that the latching component can be displaced by means of an electromagnetic actuator. Alternatively, the latching component can be connected to a hydraulic piston or is designed at least in sections as a hydraulic piston. According to a further alternative, the latching component has an engagement contour for a mechanical actuator. In all three alternatives, the latching component can be easily and reliably actuated, i.e. transferred from the latching state to the unlatching state and vice versa.

Preferably, the teeth of the internal toothing of the sliding sleeve and/or the teeth of the second external toothing are configured to be axially deflecting. In this context, a toothing configured to be axially deflecting means a toothing the teeth of which are beveled at those axial ends that are intended to engage with axial ends of the teeth of the respective other toothing such that in a state in which the teeth engage with each other and a torque is transmitted, an axial force in the opening direction acts on the sliding sleeve. The axial force must be greater than any frictional forces which may act axially in the closing direction. A coupling device provided with an axially deflecting toothing can therefore always open when torque is applied thereon. Accordingly, such coupling devices are also referred to as self-opening coupling devices. The most important design parameter is the angle at which the axial ends of the teeth are beveled. It must be dimensioned such that the axial force resulting from the axially deflecting design of the teeth is greater in all operating situations than frictional forces acting in the closing direction or maintaining the closed state. Such coupling devices consequently assume their opening state, i.e. the release state, with a high degree of reliability. This is particularly true when they are not actuated. At the same time, the closed state, i.e. the rotationally coupled state, can be maintained with a high degree of reliability due to the locking unit and, if applicable, the latching unit.

In one embodiment, the locking contour on the first coupling component is a peripherally at least sectionally circumferential groove. Such a locking contour can be produced with low effort and high precision using known methods and equipment. Furthermore, such a locking contour is compact.

At least one of the walls of the locking contour configured as a groove can be configured to be oblique so that a cross-section of the groove tapers in the direction of the groove base. In this way, an axial force acting on the first coupling component, for example due to a toothing designed to be axially deflecting, can be at least partially diverted in a desired manner via the obliquely designed wall of the groove and the locking element. In particular, part of the axial force can be diverted in the radial direction. This portion of the force can be supported with comparatively little effort.

The locking unit can comprise a plurality of locking elements arranged distributed on the periphery of the sliding sleeve. In particular, the locking elements are distributed substantially uniformly on the periphery of the sliding sleeve. This allows the sliding sleeve to be reliably held in the rotationally coupled state. The provision of a plurality of locking elements has the effect that canting and/or jamming of moving components, in particular of the sliding sleeve, cannot occur within the coupling device. The coupling device can thus be operated in a reliable manner.

Advantageously, at least one locking element is a locking pin or a locking ball. Such locking elements are easily and inexpensively available on the market as common semi-finished products. They thus lead to a comparatively simple and cost-effective structure of the coupling device.

In one alternative design, each locking element is mounted so as to be substantially radially displaceable in a radial opening of the sliding sleeve. Here, a radial opening is understood to be an opening having a substantially radially extending central axis. The radial openings are configured, for example, as radial bores. Such a design is simple and cost-effective.

The sliding sleeve can be pretensioned in the opening direction. In case the sliding sleeve is pretensioned by means of a spring or a spring means, this is also referred to as spring return in the opening direction. A wave spring pack can be used for this purpose. The pretensioning of the sliding sleeve in the opening direction causes it to assume a position corresponding to the release state of the coupling device with a high degree of reliability in the absence of actuation.

Preferably, the coupling device comprises an actuator which is operatively coupled to the sliding sleeve such that the sliding sleeve can be transferred at least from the release state to the rotationally coupled state by means of the actuator. As already mentioned, the actuator may be an electromagnetic actuator, a hydraulic actuator or a mechanical actuator. If the actuator is only required to transfer the sliding sleeve from the release state to the rotationally coupled state, but transfer from the rotationally coupled state to the release state takes place without actuating the actuator, this is referred to as a normally-open coupling. Such a coupling also assumes the release state in the event of a fault.

The object is further achieved by a method of the type initially mentioned, wherein, starting from a release state in which the internal toothing and the second external toothing are disengaged so that the first coupling component and the second coupling component are rotationally decoupled, the sliding sleeve is displaced axially. The internal toothing thus comes into engagement with the second external toothing, and the sliding sleeve assumes a rotationally coupled state in which the first coupling component and the second coupling component are coupled in a torque-conducting manner. Furthermore, the sliding sleeve is locked so as to be held in a form-fitting manner in the rotationally coupled state. Alternatively, starting from a rotationally coupled state in which the first coupling component and the second coupling component are coupled in a torque-conducting manner and the sliding sleeve is furthermore locked so as to be held in a form-fitting manner in the rotationally coupled state, the sliding sleeve is unlocked and displaced axially. The internal toothing and the second external toothing are thus disengaged, and the sliding sleeve assumes a release state in which the first coupling component and the second coupling component are rotationally decoupled. In this way, the rotationally coupled state can be maintained with a high degree of reliability, so that even in situations in which the torque to be transmitted by means of the coupling device varies in magnitude and/or changes sign, there is no risk of the coupling device being shifted in an undesired manner.

In one variant, the locking state of the sliding sleeve is latched after being reached, or the locking state of the sliding sleeve is unlatched before the sliding sleeve is unlocked. Consequently, the locking state and thus also the rotationally coupled state are maintained with particularly high reliability.

Incidentally, the effects and advantages discussed in connection with the coupling device according to the disclosure also apply to the method according to the disclosure and vice versa.

DETAILED DESCRIPTION

Figure 1:
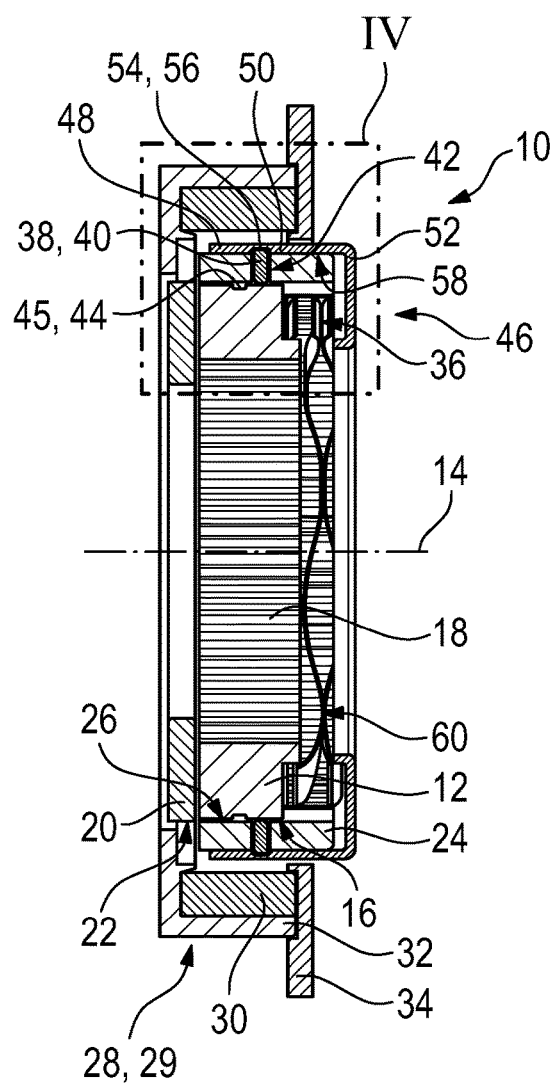
FIG. 1 shows a coupling device according to the disclosure in a first embodiment, which can be operated using a method according to the disclosure, in a radial section comprising an axis of rotation.

FIG. 1 shows a coupling device 10 according to a first embodiment, which is configured for coupling two components not shown in more detail in a torque-conducting manner.

For this purpose, the coupling device 10 comprises a first coupling component 12 which is rotatable about an axis of rotation 14.

In the embodiment shown, the first coupling component 12 is substantially annular.

The first coupling component 12 has a first external toothing 16 on its outer periphery, which in the illustrated embodiment is peripherally fully circumferential.

On its inner periphery, the first coupling component 12 is provided with a coupling toothing 18.

The coupling toothing 18 serves to connect the first coupling component 12 in a torque-conducting manner to one of the components to be coupled, which are not shown in greater detail. In other words, the component to be coupled can be fastened to the first coupling component 12 via the coupling toothing 18 in a manner that is at least torque-conducting.

Furthermore, the coupling device 10 comprises a second coupling component 20 which is also rotatable about the axis of rotation 14.

In the illustrated example embodiment, the second coupling component 20 is also configured to be substantially annular. More specifically, it is an annular disk, which can also be referred to as a clutch disk due to its function.

At its outer periphery, the second coupling component 20 has a second external toothing 22 which, in the illustrated example embodiment, is peripherally fully circumferential.

In addition, the second coupling component 20 can be connected in a torque-conducting manner to one of the components to be coupled, which are not shown in more detail. For example, an inner periphery of the second coupling component 20 may be welded to the component to be coupled for this purpose.

It is understood that the first coupling component 12 and the second coupling component 20 are each connected to different components to be coupled.

The coupling device 10 also includes a sliding sleeve 24.

The sliding sleeve 24 is also configured to be substantially annular in shape.

In addition, the sliding sleeve 24 has an internal toothing 26 on its inner periphery which is peripherally fully circumferential in the illustrated example embodiment.

The internal toothing 26 is permanently engaged with the first external toothing 16. The sliding sleeve 24 and the first coupling component 12 are thus coupled in a torque-conducting manner. However, the sliding sleeve 24 and the first coupling component 12 can be displaced relative to each other in the axial direction due to the fact that the internal toothing 26 and the first external toothing 16 are formed as spur toothing.

Such a displacement allows the internal toothing 26 to be selectively brought into engagement with the second external toothing 22 of the second coupling component 20.

Thus, the coupling device 10 can assume a rotationally coupled state in which the internal toothing 26 of the sliding sleeve 24 is engaged with both the first external toothing 16 and the second external toothing 22. Consequently, in the rotationally coupled state, the first coupling component 12 and the second coupling component 20 are coupled in a torque-conducting manner.

Further, the coupling device 10 may assume a release state in which the internal toothing 26 and the second external toothing 22 are disengaged. Consequently, in the release state, the first coupling component 12 and the second coupling component 20 are rotationally decoupled from each other.

In the following, the terms release state and rotationally coupled state will be used on the one hand to describe the shifting state of the coupling device 10. In addition, however, the terms release state and rotationally coupled state are also used to describe the position of the sliding sleeve 24 along the axis of rotation 14.

Figure 7:
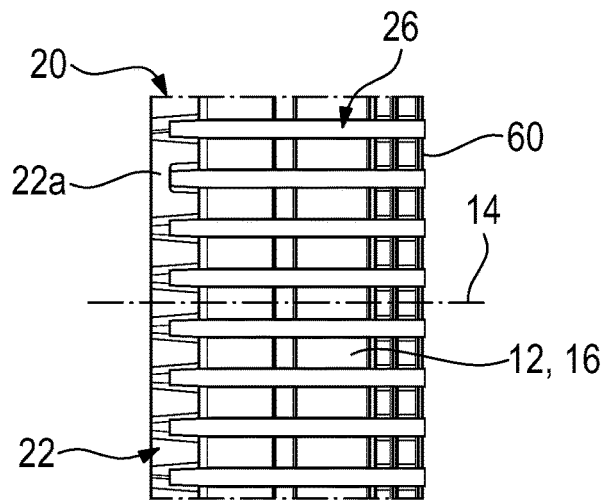
FIG. 7 shows a detailed view of an internal toothing of a sliding sleeve of the coupling device and of an external toothing of a second coupling component of the coupling device.

The teeth of the internal toothing 26 of the sliding sleeve 24 as well as the teeth of the second external toothing 22 of the second coupling component 20 are designed to be axially deflecting (see in particular FIG. 7).

The axial ends of the teeth of the internal toothing 26 facing the second coupling component 20 are beveled when viewed in the radial direction. Likewise, the axial ends of the teeth of the second external toothing 22 facing the sliding sleeve 24 are configured to be beveled when viewed in a radial direction.

The angles of the bevels are selected such that in the rotationally coupled state, a torque transmission results in an axial force which acts on the sliding sleeve 24 and is oriented in the opening direction. The sliding sleeve 24 is thus urged in the direction of the release state by means of this axial force. This axial force is so great that it exceeds any frictional forces within the coupling device 10 which would hold the sliding sleeve 24 in the rotationally coupled state.

Furthermore, to limit a displacement path of the sliding sleeve 24 in the direction of the second coupling component 20, an axial stop 22a is provided in the region of the second external toothing 22.

In the first embodiment, the sliding sleeve 24 comprises a magnetizable material. More specifically, the sliding sleeve 24 is made of a magnetizable material, for example of a ferromagnetic steel.

Furthermore, the coupling device 10 is equipped with an actuator 28, which in the first embodiment is an electromagnetic actuator 29.

The electromagnetic actuator 29 comprises a solenoid coil 30 which can be driven electrically and is mounted in an actuator housing 32. The actuator housing 32 is fixable in space with the solenoid coil 30 via a flange 34.

The sliding sleeve 24 and the electromagnetic actuator 29 are coupled such that the sliding sleeve 24 can be displaced along the axis of rotation 14, i.e. axially, by driving the electromagnetic actuator 29.

As will be explained further below, the electromagnetic actuator 29 is designed in the first embodiment such that it can displace the sliding sleeve to the left in FIG. 1, i.e. pull the sliding sleeve 24 into the interior of the solenoid coil 30. This is equivalent to allowing the sliding sleeve 24, and thus the coupling device 10, to be transferred from the release state to the rotationally coupled state by means of the electromagnetic actuator 29.

The coupling device 10 also comprises a locking unit 36.

Figure 3:
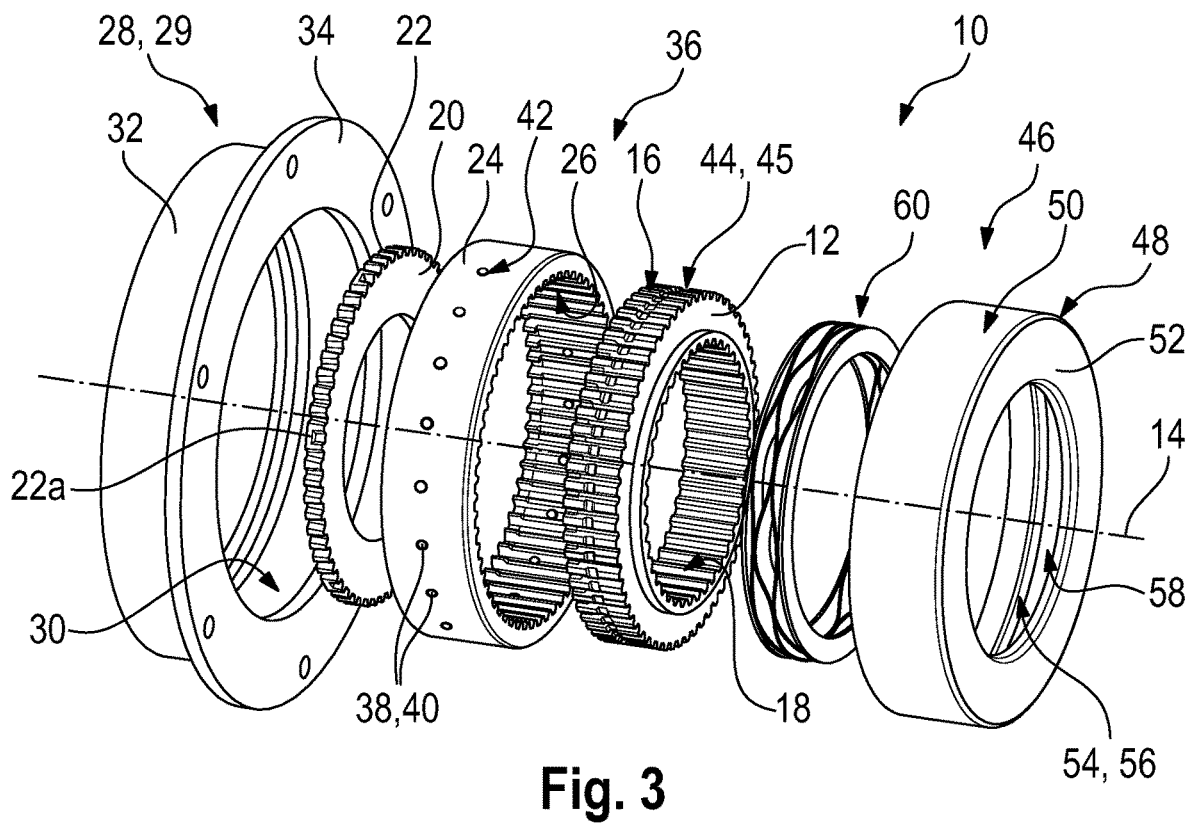
FIG. 3 shows an exploded view of the coupling device of FIG. 1 and FIG. 2.

In this context, the locking unit 36 comprises a plurality of locking elements 38 which are arranged uniformly distributed at the periphery of the sliding sleeve 24 (see in particular FIG. 3, where only some locking elements 38 are provided with a reference numeral).

In the first embodiment, the locking elements 38 are configured as locking pins 40. However, it is conceivable in the same way to use locking balls instead of locking pins 40.

The locking pins 40 are mounted in radial openings 42 arranged in a uniformly distributed manner on the periphery of the sliding sleeve 24. The locking pins 40 can be displaced within the respective associated radial opening 42, i.e. in the radial direction.

The locking unit 36 further comprises a locking contour 44 provided on the first coupling component 12.

The locking contour 44 is configured as a groove 45 which is circumferential at the periphery in a plurality of segments (see in particular FIG. 3).

The axial walls 45a, 45b of the groove 45 extend obliquely, so that a cross-section of the groove 45 tapers in the direction of the groove base.

The locking elements 38, configured as locking pins 40, and the locking contour 44, configured as groove 45, are arranged relative to each other such that the locking pins 40 can engage in the groove 45 when the sliding sleeve 24 is in the rotationally coupled state.

The locking pins 40 are each provided with a chamfer corresponding to the inclined walls 45a, 45b at that end which is intended to engage in the groove 45.

Thus, the locking unit 36 can selectively assume a locking state defined by the locking elements 38 engaging in the locking contour 44. The locking state is adapted to retain the sliding sleeve 24 in a form-fitting manner in the rotationally coupled state.

A state in which the locking elements 38, i.e., the locking pins 40, are located outside the locking contour 44 is referred to as an unlocking state.

The coupling device 10 further comprises a latching unit 46 configured to selectively latch the locking unit 36 in its locking state.

The latching unit 46 has a latching component 48. In the first embodiment, the latter is formed from a substantially sleeve-shaped portion 50 and a substantially ring-shaped portion 52.

The latching component 48, more specifically a substantially sleeve-shaped portion 50 thereof, peripherally surrounds the sliding sleeve 24 at least in sections. In other words, the sliding sleeve 24 is radially received at least in sections within the substantially sleeve-shaped portion 50 of the latching component 48.

The substantially annular portion 52 is attached to an axial end of the substantially sleeve-shaped portion 50 shown on the right in FIG. 1.

The substantially sleeve-shaped portion 50 includes a receiving contour 54, which in the illustrated embodiment is configured as a peripherally fully circumferential groove 56.

That wall 56a of the groove 56 which is further away from the second coupling component 20 is configured to be beveled. The groove 56 is thus narrower in the region of the groove base than in the region of the groove opening.

The receiving contour 54, more specifically the groove 56, is configured to receive a portion of each of the locking elements 38, that is, the locking pins 40.

Accordingly, a state in which the locking elements 38 are received in the receiving contour 54 at least in sections is referred to as an unlatching state.

The substantially sleeve-shaped portion 50 also includes a latching contour 58, which is substantially formed by the peripheral portion of the latching component 48 located to the right of the receiving contour 54 in the axial direction in FIG. 1.

When the locking elements 38, i.e. the locking pins 40, are in the locking state, the respective radially outer ends thereof can abut the latching contour 58 and in this way be prevented from leaving the locking state, i.e. from being transferred to the unlocking state.

A latching state is thus defined by the locking elements 38 abutting the latching contour 58 and thus being held in the locking state.

In the illustrated embodiment, the latching component 48 also comprises a magnetizable material. In the present case, the latching component 48 is made of a ferromagnetic steel.

Thus, the latching component 48 can also be displaced along the axis of rotation 14 by means of the electromagnetic actuator 29.

More precisely, the latching component 48 can also be moved to the left in the axial direction in FIG. 1 by means of the electromagnetic actuator 29.

A spring means 60 is provided axially between the first coupling component 12 and the latching component 48, more specifically the substantially annular portion 52, and is configured to bias the first coupling component 12 and the latching component 48 away from each other.

After the sliding sleeve 24 and the latching component 48 are coupled in the axial direction when the locking elements 38 engage in the receiving contour 54, the sliding sleeve 24 is also pretensioned in the opening direction, i.e. in the direction of the release state, by means of the spring means 60 in the unlatching state.

Figure 2:
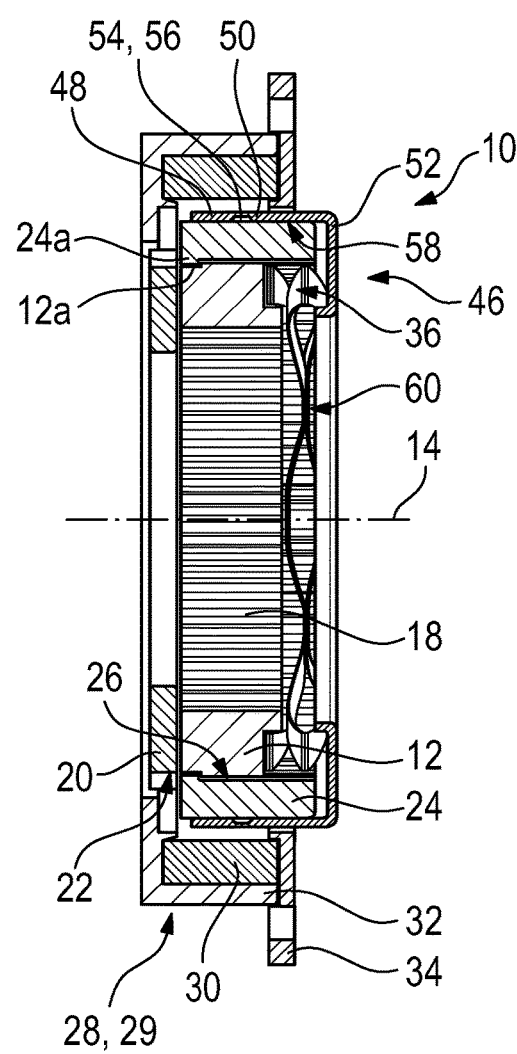
FIG. 2 shows the coupling device of FIG. 1 in a radial section along a sectional plane rotated about the axis of rotation with respect to FIG. 1.

In a peripheral portion, the sliding sleeve 24 is provided with a radially inwardly facing projection 24a which can engage with a radial step 12a formed on a radially opposite peripheral portion of the first coupling component 12. Thus, the sliding sleeve 24 can be moved away from the second coupling component 20 in the axial direction only until the projection 24a is in contact with an associated abutment surface of the radial step 12a (see FIG. 2).

Figure 4:
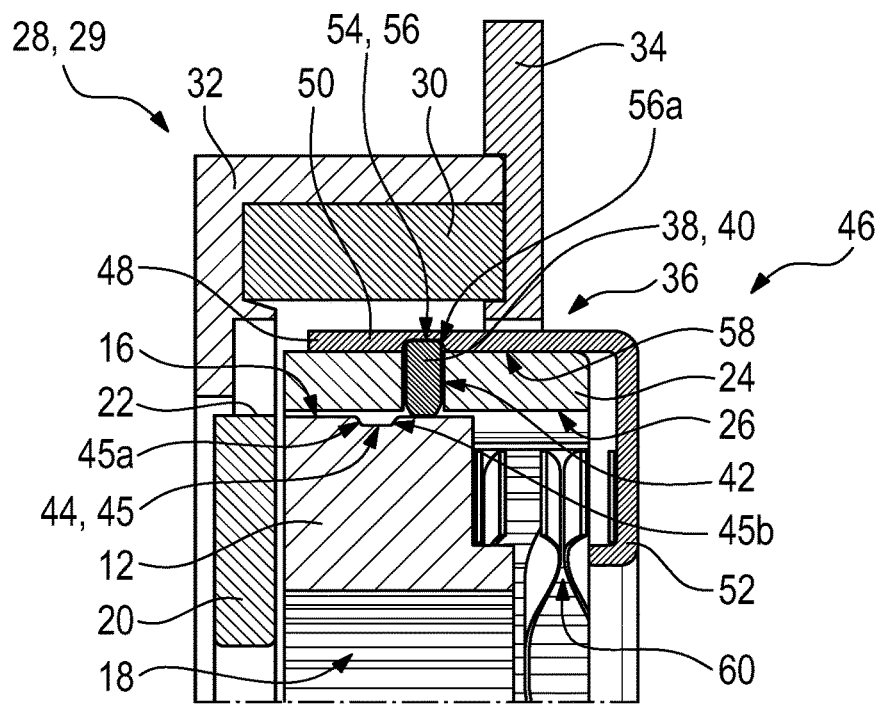
FIG. 4 shows a detail IV of the coupling device of FIG. 1, the coupling device being shown in a release state.
Figure 5:
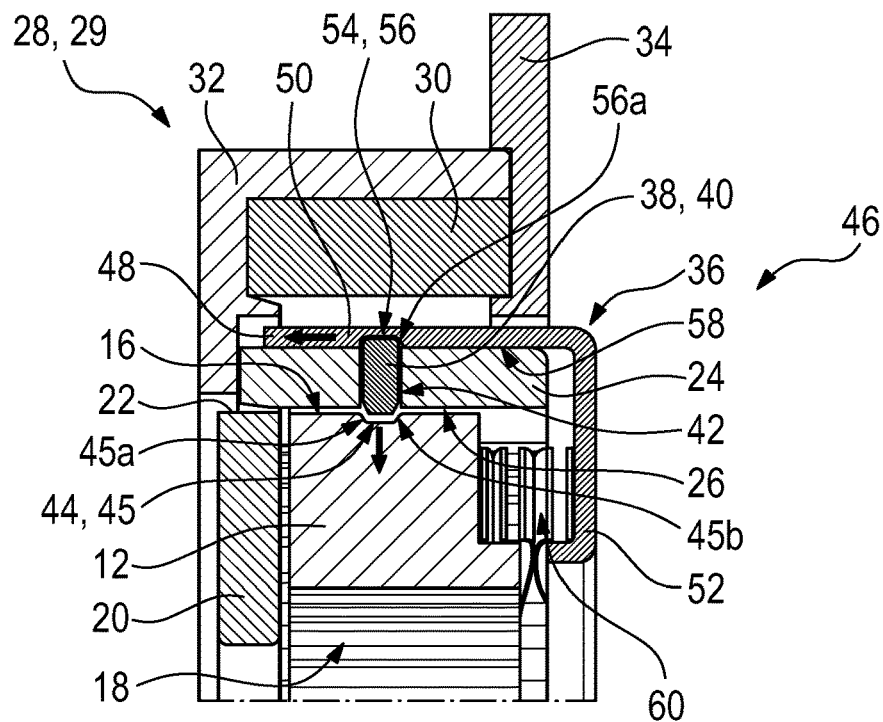
FIG. 5 shows the detail IV of the coupling device of FIG. 1, the coupling device being shown in a rotationally coupled state in which the locking unit assumes an unlocking state.
Figure 6:
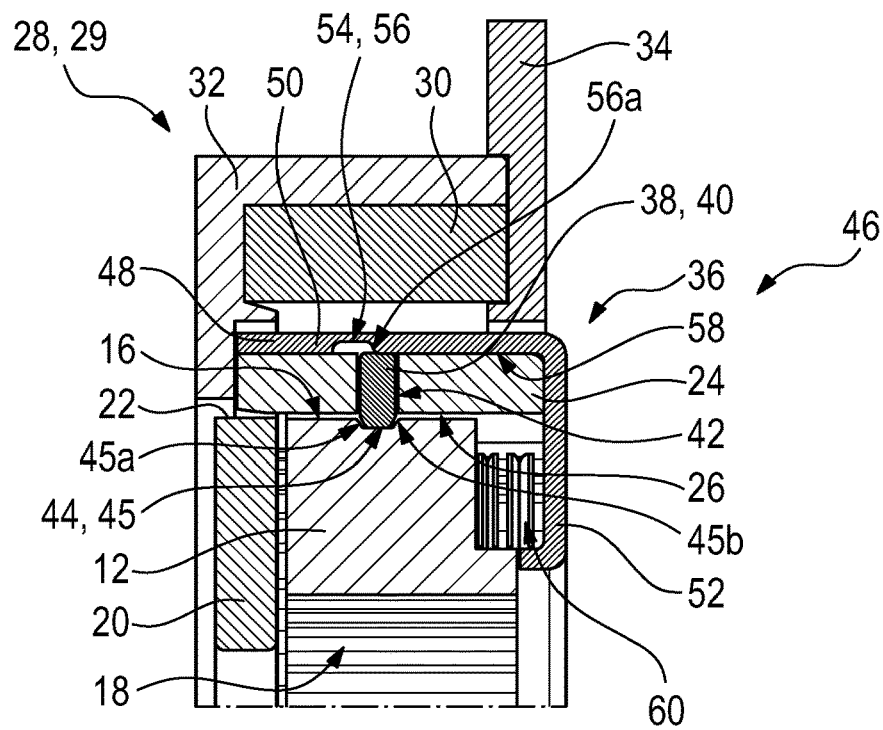
FIG. 6 shows the detail IV of the coupling device of FIG. 1, the coupling device being shown in a rotationally coupled state in which the locking unit assumes a locking state and the latching unit assumes a latching state.

The coupling device 10 can be operated by means of the method explained in detail with reference to FIGS. 4 to 6.

Purely for purposes of simpler explanation, the coupling device 10 is initially in the release state. The locking unit 36 is in the unlocking state, and the latching unit 46 is in the unlatching state (see FIG. 4).

Thus, the internal toothing 26 and the second external toothing 22 are disengaged. The locking elements 38 are also located outside the locking contour 44 and at the same time are each received in sections in the receiving contour 54.

The holding of such a state is assisted by the spring means 60 which biases the first coupling component 12, the latching component 48 and the sliding sleeve 24 coupled thereto away from each other.

If the coupling device 10 is now to be transferred to the rotationally coupled state, the electromagnetic actuator 29 is driven. Thus, the solenoid coil 30 generates a magnetic field by means of which the sliding sleeve 24 and the latching component 48, each comprising magnetizable materials, are pulled into the interior of the solenoid coil 30. Thus, in the figures, the sliding sleeve 24 and the latching component 48 move to the left, with the sliding sleeve 24 and the latching component 48 being motion-coupled by means of the locking elements 38 (see the synopsis of FIGS. 4 and 5).

Thus, the second external toothing 22 of the second coupling component 20 engages the internal toothing 26. The internal toothing 26 is pushed axially into the second external toothing 22 until it comes into contact with the axial stop 22a (see also FIG. 7).

The coupling device 10 or the sliding sleeve 24 thus assumes the rotationally coupled state. However, the locking unit 36 is still in the unlocking state, and the latching unit 46 is in the unlatching state (see FIG. 5).

However, the locking elements 38 are now radially opposite the locking contour 44.

Moreover, the latching component 48 is not yet in axial contact with its stop, which is formed by an axial end face of the sliding sleeve 24 against which the substantially annular portion 52 of the latching component 48 can abut.

The latching component 48 is therefore further displaced in the axial direction towards the second coupling component 20 by means of the solenoid coil 30.

Due to the obliquely designed wall 56a of the receiving contour 54, which is designed as a groove 56, the further axial displacement of the latching component 48 causes the locking elements 38 to move out of the receiving contour 54 and thus come into engagement with the locking contour 44, which is also configured as a groove 45.

The locking unit 36 is thus transferred to the locking state.

As soon as the locking elements 38 have left the receiving contour 54, the latching component 48 can be displaced axially relative to the locking elements 38 such that they come into contact with the latching contour 58. The latching unit is thus transferred to the latching state (see FIG. 6).

The sliding sleeve 24 is thus held in a form-fitting manner in the rotationally coupled state.

Due to the fact that the external toothing 22 and the internal toothing 26 are configured to be axially deflecting, the actuator 28 must remain driven for the entire period during which the coupling device 10 is to be in the rotationally coupled state.

In this state, the axial force resulting from the axially deflecting design is introduced into the locking elements 38, which are designed as locking pins 40, via the inclined wall 45a of the locking contour 44, which is designed as a groove 45.

Due to the inclined design of the wall 45a, the axially directed force is at least partially diverted in the radial direction. A corresponding, radially acting counterforce is provided by the contact of the locking elements 38 with the latching contour 58.

Only the remaining axial proportion must be absorbed by the electromagnetic actuator 29. A comparatively low power is sufficient therefor. In particular, the power required for this purpose is less than a power that would be required to absorb the entire force resulting from the axially deflecting design of the second external toothing 22 and the internal toothing 26.

It will be understood that the spring means 60 counteracts the shifting of the coupling device 10 from the release state to the rotationally coupled state. Spring forces provided by the spring means 60 must therefore be overcome to transfer the coupling device 10 to the rotationally coupled state by means of the electromagnetic actuator 29. This is equally true for holding the rotationally coupled state.

If the coupling device 10 is to be transferred from the rotationally coupled state back to the release state, it is sufficient to de-energize the actuator 28. Then, the latching component 48 is displaced to the right in the figures due to the action of the spring means 60.

Moreover, due to the fact that the wall 45b of the locking contour 44 designed as a groove 45 is also inclined, the locking elements 38 are acted upon radially outwards by means of the spring force provided by the spring means 60.

Thus, as soon as the receiving contour 54 is radially opposite the locking elements 38, the respective radially outward portions of the locking elements 38 engage into the receiving contour 54.

This results in a coupling of the latching component 48 and the sliding sleeve 24, so that the spring loading also moves the sliding sleeve 24 in the direction of the release state.

In addition, due to the axially deflecting design of the second external toothing 22 and the internal toothing 26, the sliding sleeve 24 always pushes toward the release state.

It will be understood that the shifting from the rotationally coupled state to the release state may occur due to a desired de-energizing of the electromagnetic actuator 29.

However, the coupling device 10 behaves identically when the actuator 28 is de-energized due to an unplanned event, for example because of a power supply failure. Even then, the coupling device 10 is reliably transferred to the release state, so that it always assumes a defined state even in the event of a fault.

Figure 8:
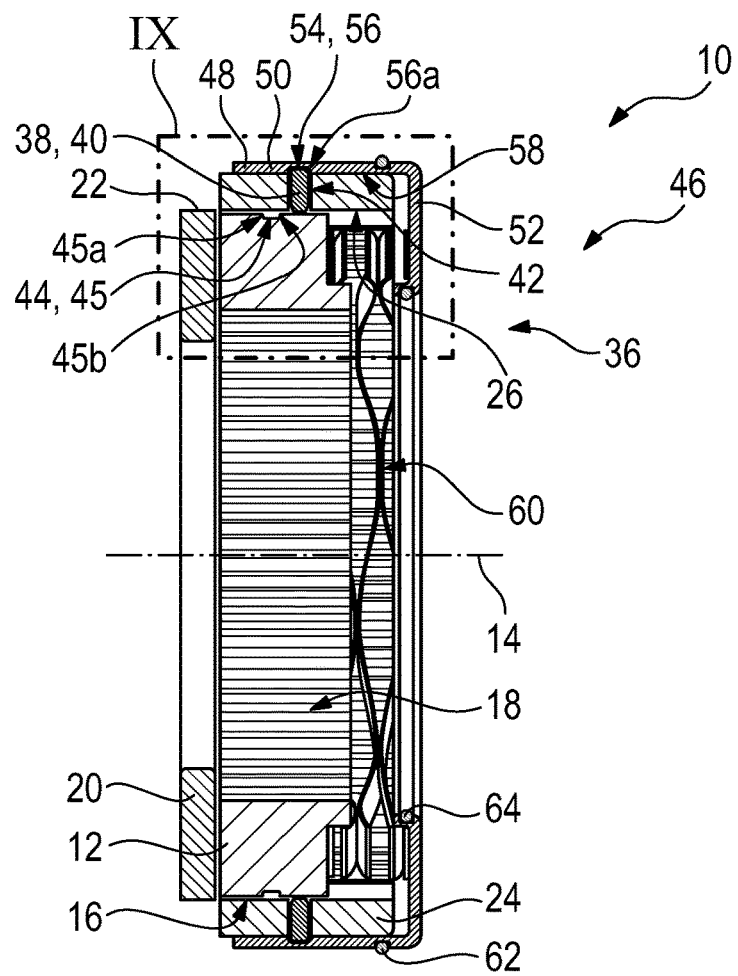
FIG. 8 shows a coupling device according to the disclosure in a second embodiment, which can be operated using a method according to the disclosure, in a radial section comprising an axis of rotation.
Figure 9:
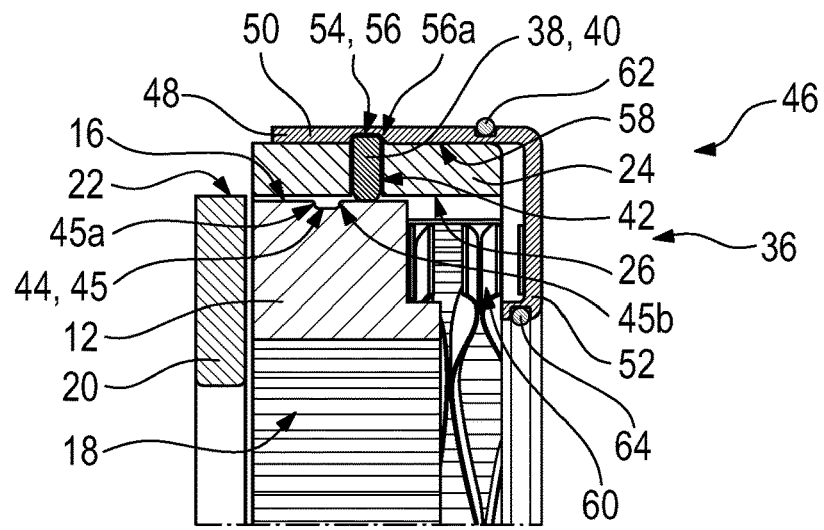
FIG. 9 shows a detail IX of the coupling device of FIG. 8.
Figure 10:
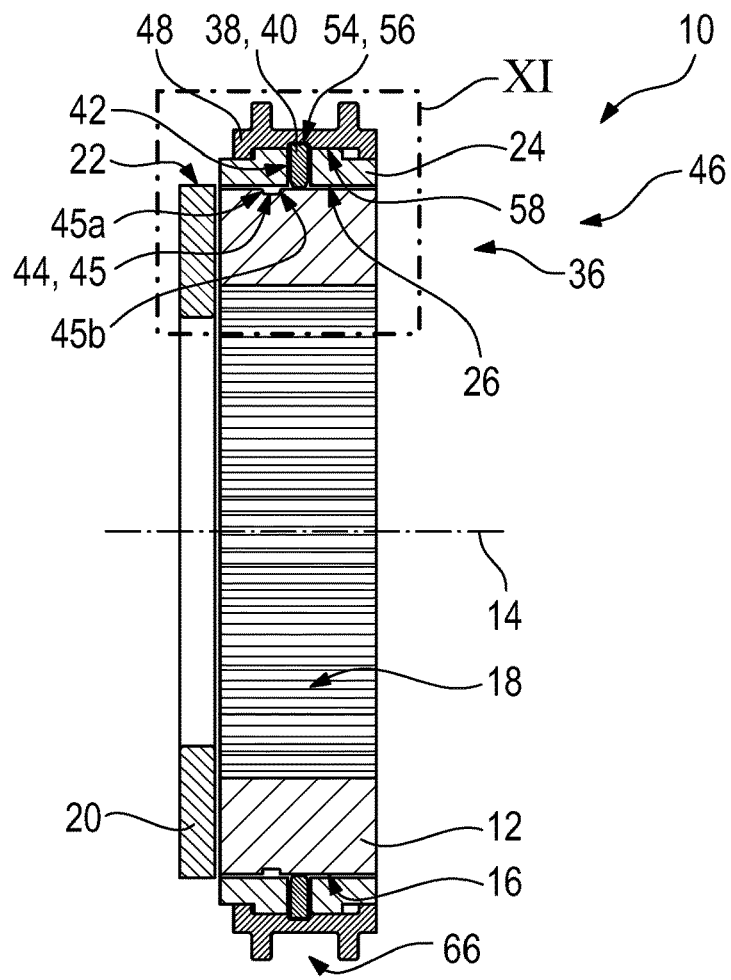
FIG. 10 shows a coupling device according to the disclosure in a third embodiment, which can be operated using a method according to the disclosure, in a radial section comprising an axis of rotation.
Figure 11:
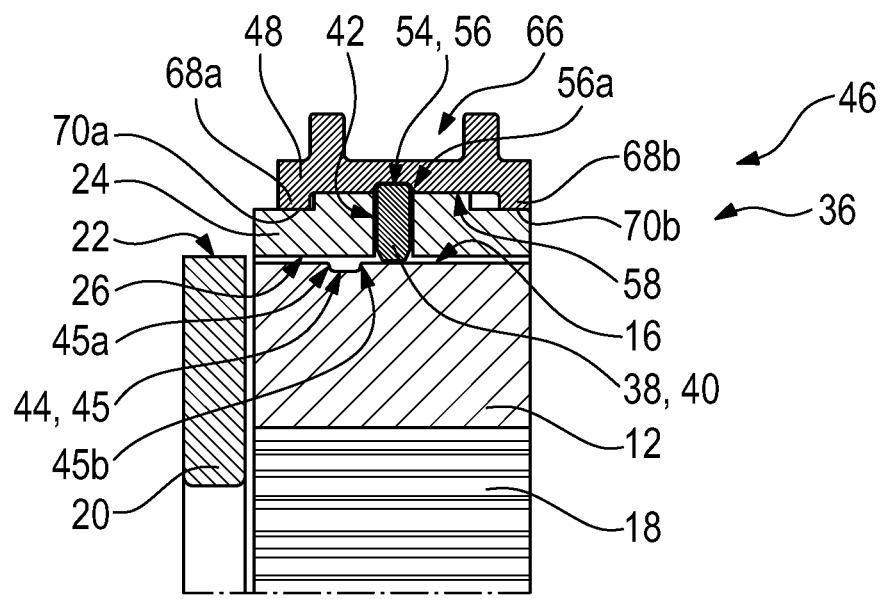
FIG. 11 shows a detail XI of the coupling device of FIG. 10, the coupling device being shown in a release state.

FIGS. 8 and 9 show a coupling device 10 according to a second embodiment.

Only the differences from the first embodiment, which has already been explained in detail, are discussed here. Identical or corresponding components are provided with the same reference numerals.

The coupling device 10 according to the second embodiment does not comprise an electromagnetic actuator. Instead, a portion of the latching component 48 shown on the right in FIGS. 8 and 9 is designed as a hydraulic piston.

For this purpose, a peripherally fully circumferential seal 62 is provided at the outer periphery of the latching component 48.

A peripherally fully circumferential seal 64 is also provided on the inner periphery of the latching component 48, more specifically on the inner periphery of the substantially annular portion 52 thereof.

The latching component 48 thus constitutes an annular piston. The latter can be arranged in an associated hydraulic cylinder so as to delimit a hydraulic chamber on one side.

The coupling device 10 can thus be actuated by hydraulic pressurization of such a hydraulic chamber. The coupling device 10 is thus hydraulically transferred from the release state to the rotationally coupled state.

As before, a return of the coupling device 10 from the rotationally coupled state to the release state is driven by the axially deflecting internal toothing 26 and external toothing 22 as well as by the spring means 60.

In all other respects, reference is made to the explanations as to the first embodiment.

FIGS. 10 to 17 show a third embodiment of the coupling device 10.

Again, only the differences from the first embodiment are discussed. Identical or corresponding components are again provided with the same reference numerals.

The differences again relate to the latching component 48. It no longer comprises an annular portion compared to the first embodiment.

Thus, in the third embodiment, the latching component 48 is on the whole substantially sleeve-shaped.

An engagement contour 66 is provided on an outer periphery of the latching component 48, in which a mechanical actuator, for example in the form of a shift fork, can engage.

There is no longer any spring loading. Accordingly, the spring means 60 is also omitted compared to the first embodiment.

A further difference is that in the third embodiment, the teeth of the external toothing 22 of the second coupling component 20 and the teeth of the internal toothing 26 of the sliding sleeve 24 are configured to be blunt. In other words, these teeth are no longer axially deflecting.

Thus, the coupling device 10 according to the third embodiment is transferred from the release state to the rotationally coupled state as well as from the rotationally coupled state to the release state by means of the mechanical actuator engaging the engagement contour 66. The mechanical actuator can therefore be described as two-sided or double-acting.

To limit relative axial displacement between the latching component 48 and the sliding sleeve 24 to the desired extent, radially inwardly facing projections 68a, 68b are provided on the latching component 48 at both axial ends (see FIGS. 10 to 15)

Steps 70a, 70b are accordingly provided on an outer periphery of the sliding sleeve 24.

Projections 68a, 68b and steps 70a, 70b associated with each other consequently form axial stops so that relative movement of the latching component 48 with respect to the sliding sleeve 24 is limited axially on both sides.

It will be understood that the projections 68a, 68b and the steps 70a, 70b need not necessarily be peripherally fully circumferential. Both the projections 68a, 68b and the steps 70a, 70b may extend over only a peripheral portion.

Further, an anti-rotation means 72 is provided to prevent the sliding sleeve 24 and the latching component 48 from rotating relative to each other.

For this purpose, at least one anti-rotation pin 74 is inserted into an associated radial bore 76 of the sliding sleeve 24 such that it protrudes from the outer periphery thereof. The anti-rotation pin 74 engages in an elongated hole 78 extending in the axial direction on the latching component 48.

A width of the elongated hole 78 measured in the peripheral direction substantially corresponds to a diameter of the anti-rotation pin 74. In the axial direction, the elongated hole 78 is so much larger than a diameter of the anti-rotation pin 74 that an axial relative movement between the latching component 48 and the sliding sleeve 24 is not obstructed.

In all other respects, in particular in connection with the locking unit 36 and the latching unit 46, reference is made to the explanations as to the first embodiment.

Figure 12:
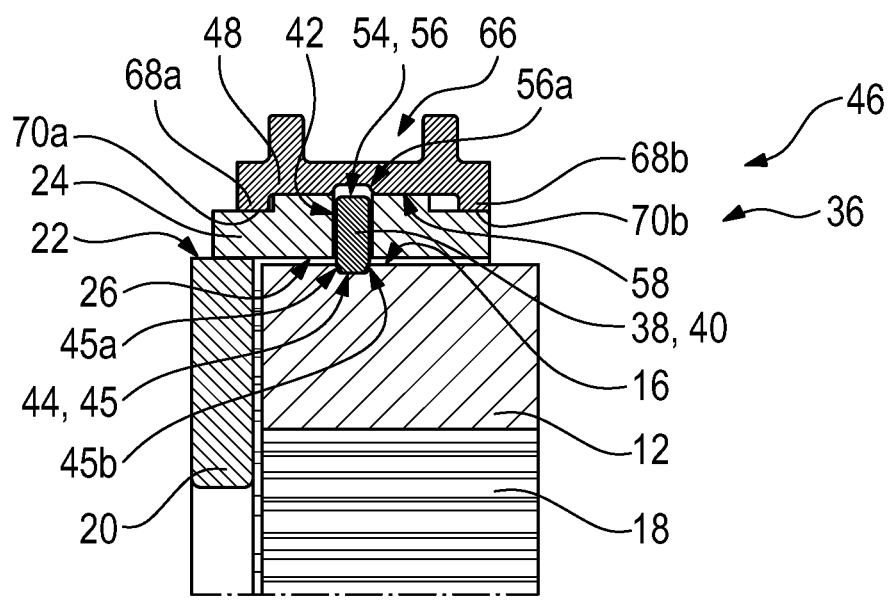
FIG. 12 shows the detail XI of the coupling device of FIG. 10, the coupling device being shown in a rotationally coupled state in which the locking unit assumes a locking state and the latching unit assumes an unlatching state.
Figure 13:
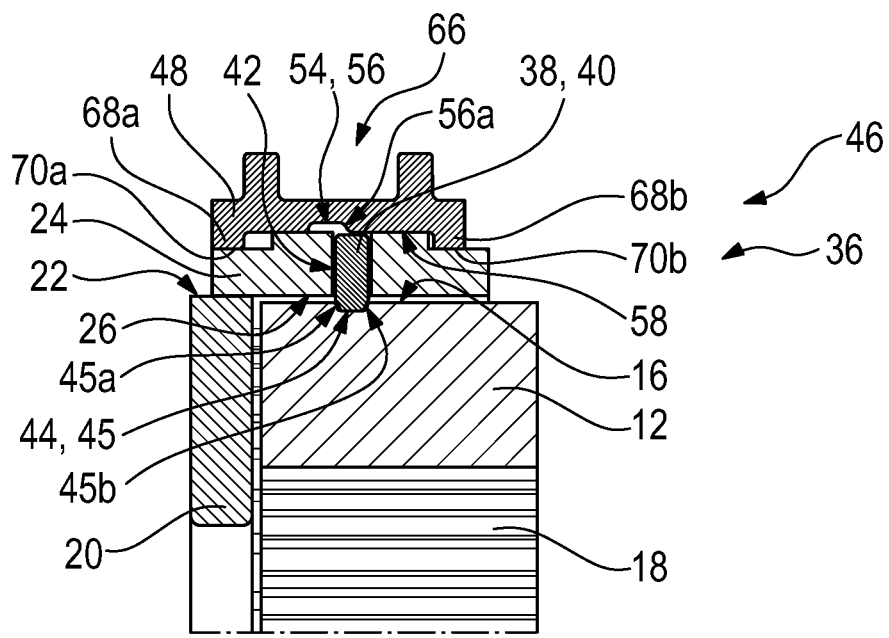
FIG. 13 shows the detail XI of the coupling device of FIG. 10, the coupling device being shown in a rotationally coupled state in which the locking unit assumes a locking state and the latching unit assumes a latching state.
Figure 14:
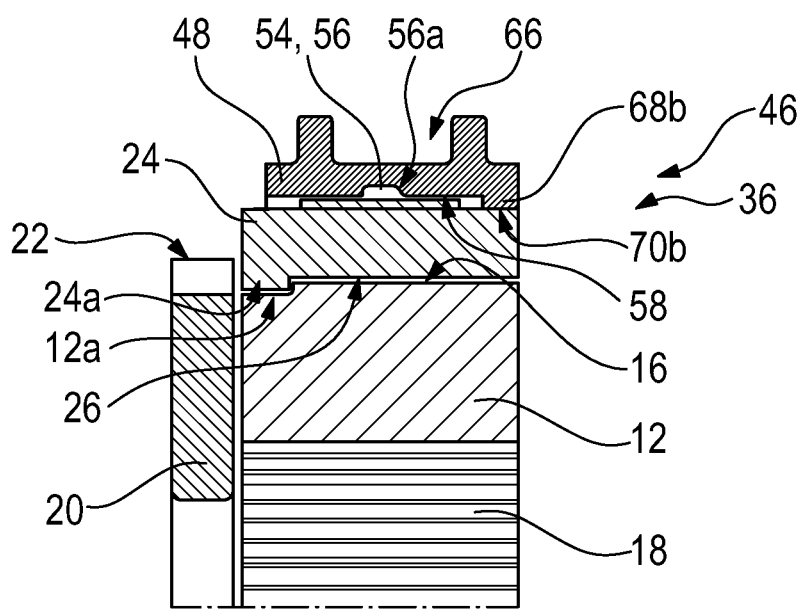
FIG. 14 shows a detail corresponding to detail XI associated with a radial section rotated about the axis of rotation with respect to the radial section of FIG. 10.
Figure 15:
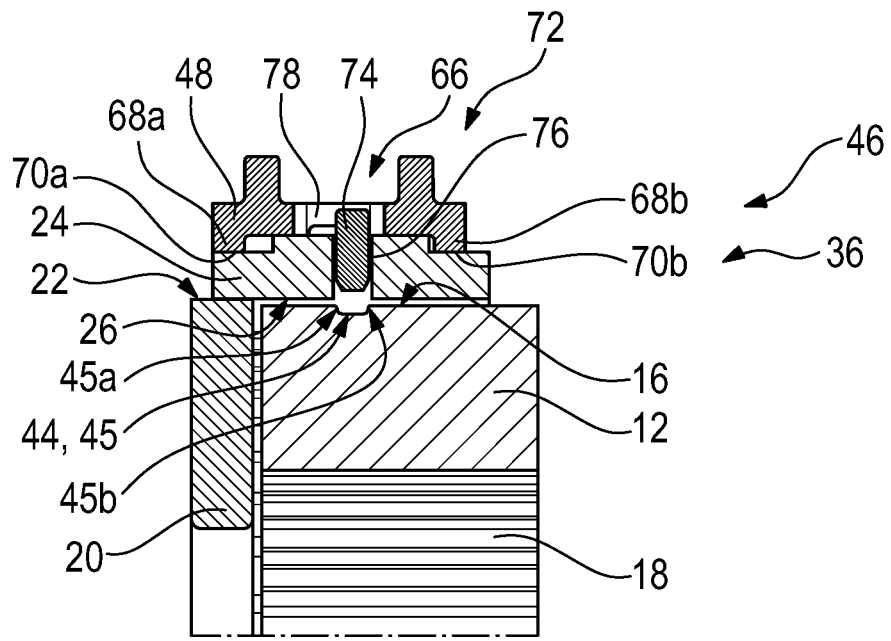
FIG. 15 shows a detail corresponding to detail XI associated with a radial section rotated about the axis of rotation with respect to the radial section of FIG. 10 and the radial section of FIG. 14.
Figure 16:
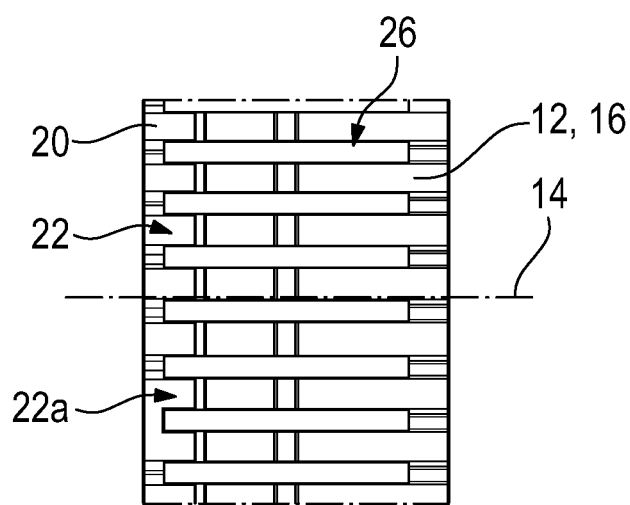
FIG. 16 shows a detailed view of an internal toothing of a sliding sleeve of the coupling device according to the third embodiment and of an external toothing of a second coupling component of the coupling device according to the third embodiment.
Figure 17:
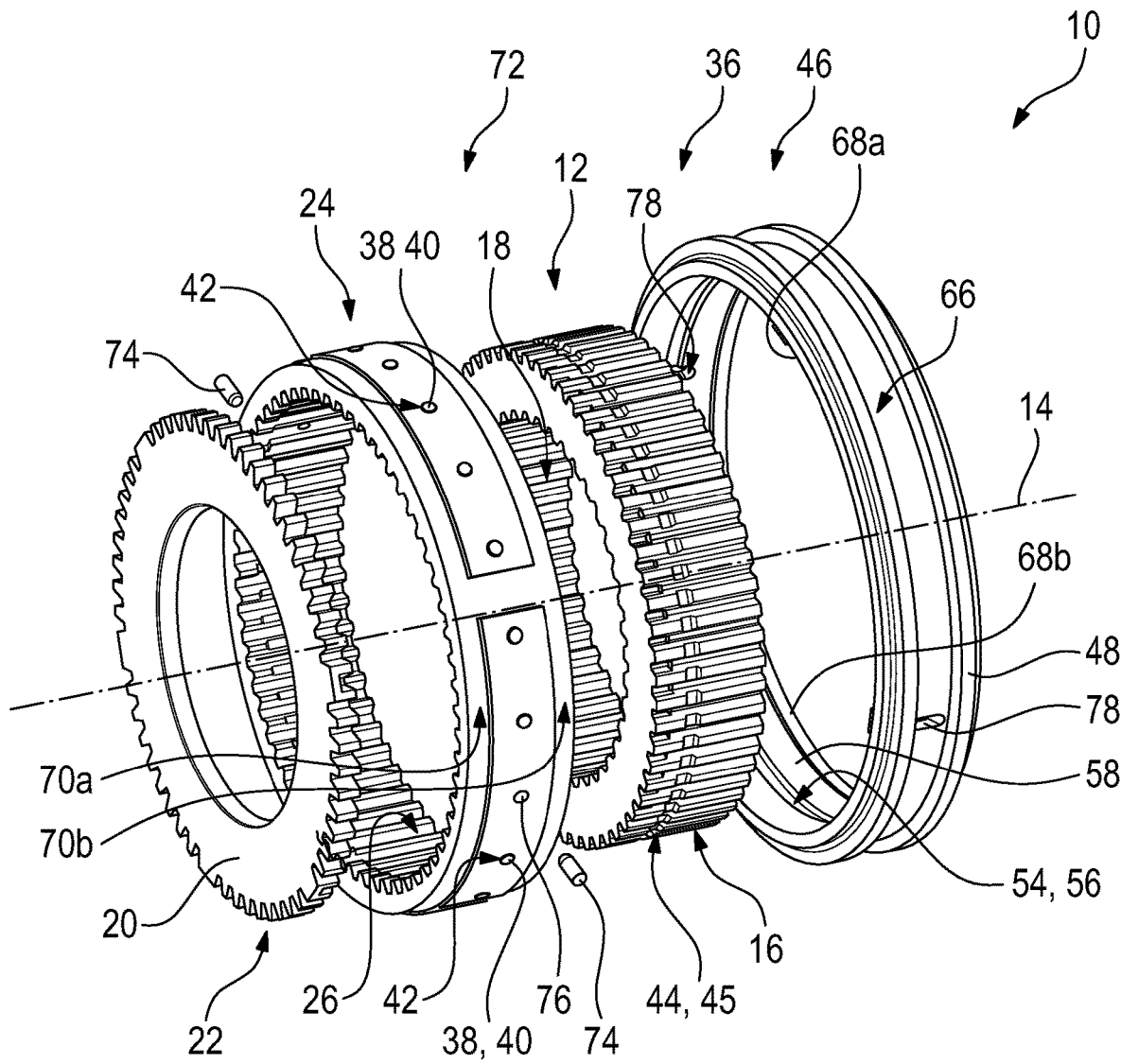
FIG. 17 shows an exploded view of the coupling device according to the third embodiment.

The same applies to the method of operating the coupling device 10 according to the third embodiment. In this context, the state shown in FIG. 11 corresponds to the state shown in FIG. 4. The state shown in FIG. 13 corresponds to the state shown in FIG. 6. FIG. 12 shows an intermediate.

The invention claimed is:

1. A coupling device for coupling two components in a torque-conducting manner, comprising:
   a first coupling component which is rotatable about an axis of rotation, has an at least sectionally circumferential first external toothing, and is adapted to be fastened to one of the components to be coupled,
   a second coupling component which is rotatable about an axis of rotation, has an at least sectionally circumferential second external toothing, and is adapted to be fastened to the other of the components to be coupled, and
   a sliding sleeve which has an at least sectionally circumferential internal toothing which is permanently engaged with the first external toothing and can be selectively brought into engagement with the second external toothing, so that the first coupling component and the second coupling component are coupled in a torque-conducting manner in a rotationally coupled state, in which the internal toothing is engaged with both the first external toothing and the second external toothing, and are rotationally decoupled in a release state, in which the internal toothing and the second external toothing are disengaged,
   wherein a locking unit is provided having a locking element mounted in a displaceable manner on the sliding sleeve,
   wherein the locking unit can selectively assume a locking state in which the locking element engages in a locking contour on the first coupling component so that the sliding sleeve is held in a form-fitting manner in the rotationally coupled state, and wherein the locking unit can selectively assume an unlocking state in which the locking element is located outside the locking contour,
   wherein a latching component comprises a magnetizable material, so that the latching component is displaceable by an electromagnetic actuator, and
   wherein a locking contour on the first coupling component is a peripherally at least sectionally circumferential groove limited by axial walls extending obliquely so that a cross-section of the groove tapers in the direction of a groove base, and wherein, in a locked state in which the locking element protrudes into the groove, the locking element contacts one of the oblique axial walls and is urged radially outwardly against a latching contour.

2. The coupling device according to claim 1, wherein a latching unit for selectively latching the locking unit in the locking state is provided.

3. The coupling device according to claim 2, wherein the latching unit comprises the latching component being at least sectionally sleeve-shaped and having a receiving contour and a latching contour, which peripherally surrounds the sliding sleeve at least in sections,
   wherein in a latching state, the locking element is held in the locking state by abutment against the latching contour, and in an unlatching state, the locking element is received at least in sections in the receiving contour so that the locking element can assume the unlocking state.

4. The coupling device according to claim 3, wherein the receiving contour is a peripherally at least sectionally circumferential groove.

5. The coupling device according to claim 1, wherein the sliding sleeve comprises a magnetizable material so that the sliding sleeve is displaceable by the electromagnetic actuator displacing the latching component.

6. The coupling device according to claim 1, wherein the locking unit comprises a plurality of locking elements which are arranged distributed at the periphery of the sliding sleeve.

7. The coupling device according to claim 1, wherein at least one locking element is a locking pin or a locking ball.

8. The coupling device according to claim 1, wherein the sliding sleeve is pretensioned in the opening direction only.

9. The coupling device according to claim 1, characterized by an actuator which is operatively coupled to the sliding sleeve such that the sliding sleeve can be transferred at least from the release state to the rotationally coupled state by the electromagnetic actuator.

10. A coupling device for coupling two components in a torque-conducting manner, comprising:
    a first coupling component which is rotatable about an axis of rotation, has an at least sectionally circumferential first external toothing, and is adapted to be fastened to one of the components to be coupled,
    a second coupling component which is rotatable about an axis of rotation, has an at least sectionally circumferential second external toothing, and is adapted to be fastened to the other of the components to be coupled, and
    a sliding sleeve which has an at least sectionally circumferential internal toothing which is permanently engaged with the first external toothing and can be selectively brought into engagement with the second external toothing, so that the first coupling component and the second coupling component are coupled in a torque-conducting manner in a rotationally coupled state, in which the internal toothing is engaged with both the first external toothing and the second external toothing, and are rotationally decoupled in a release state, in which the internal toothing and the second external toothing are disengaged,
    wherein a locking unit is provided having a locking element mounted in a displaceable manner on the sliding sleeve,
    wherein the locking unit can selectively assume a locking state in which the locking element engages in a locking contour on the first coupling component so that the sliding sleeve is held in a form-fitting manner in the rotationally coupled state, and wherein the locking unit can selectively assume an unlocking state in which the locking element is located outside the locking contour, and wherein a latching component is configured at least in sections as a hydraulic piston and comprises a sleeve-shaped portion and a ring-shaped portion.

11. The coupling device according to claim 10, wherein the latching component has an engagement contour for a mechanical actuator.

12. A coupling device for coupling two components in a torque-conducting manner, comprising:
- a first coupling component which is rotatable about an axis of rotation, has an at least sectionally circumferential first external toothing, and is adapted to be fastened to one of the components to be coupled,
- a second coupling component which is rotatable about an axis of rotation, has an at least sectionally circumferential second external toothing, and is adapted to be fastened to the other of the components to be coupled, and
- a sliding sleeve which has an at least sectionally circumferential internal toothing which is permanently engaged with the first external toothing and can be selectively brought into engagement with the second external toothing, so that the first coupling component and the second coupling component are coupled in a torque-conducting manner in a rotationally coupled state, in which the internal toothing is engaged with both the first external toothing and the second external toothing, and are rotationally decoupled in a release state, in which the internal toothing and the second external toothing are disengaged, wherein a locking unit is provided having a locking element mounted in a displaceable manner on the sliding sleeve, wherein the locking unit can selectively assume a locking state in which the locking element engages in a locking contour on the first coupling component so that the sliding sleeve is held in a form-fitting manner in the rotationally coupled state, and wherein the locking unit can selectively assume an unlocking state in which the locking element is located outside the locking contour, wherein the teeth of the internal toothing of the sliding sleeve and/or the teeth of the second external toothing are beveled at those axial ends that are intended to engage with axial ends of the teeth of the respective other toothing such that in a state in which the teeth engage with each other and a torque is transmitted, an axial force in the opening direction is generated on the sliding sleeve, wherein a latching component is pretensioned by spring force in the opening direction, only, and wherein the locking contour on the first coupling component is a peripherally at least sectionally circumferential groove limited by axial walls extending obliquely so that a cross-section of the groove tapers in the direction of the groove base, and wherein, in a locked state in which the locking element protrudes into the groove, the locking element contacts one of the oblique axial walls and is urged radially outwardly against a latching contour.

13. The coupling device according to claim 12, wherein each locking element is mounted in a radial opening of the sliding sleeve in a radially displaceable manner.

* * * * *